(12) United States Patent
Gentile

(10) Patent No.: US 7,031,615 B2
(45) Date of Patent: Apr. 18, 2006

(54) OPTICAL CHANNEL SELECTION AND EVALUATION SYSTEM

(75) Inventor: Philip J. Gentile, Bridgeport, NY (US)

(73) Assignee: Finisar Corporation, Sunnyvale, CA (US)

( * ) Notice: Subject to any disclaimer, the term of this patent is extended or adjusted under 35 U.S.C. 154(b) by 632 days.

(21) Appl. No.: 09/971,970

(22) Filed: Oct. 4, 2001

(65) Prior Publication Data

US 2003/0067656 A1    Apr. 10, 2003

(51) Int. Cl.
H04B 10/08        (2006.01)

(52) U.S. Cl. .................. 398/155; 398/154; 398/47; 398/75

(58) Field of Classification Search .............. 398/9–38, 398/175, 48, 68, 47, 74, 75, 79, 202, 210, 398/154, 155; 375/359; 714/622; 327/231; 356/477

See application file for complete search history.

(56) References Cited

U.S. PATENT DOCUMENTS

| | | | |
|---|---|---|---|
| 5,080,506 A | 1/1992 | Campbell et al. ............. 385/29 |
| 5,406,260 A | 4/1995 | Cummings et al. ......... 340/568 |
| 5,491,402 A | 2/1996 | Small ......................... 323/282 |
| 5,721,796 A | 2/1998 | de Barros et al. ............ 385/37 |
| 5,878,030 A | 3/1999 | Norris ........................ 370/241 |
| 6,115,468 A | 9/2000 | De Nicolo .................. 379/413 |
| 6,140,911 A | 10/2000 | Fisher et al. ........... 340/310.01 |
| 6,141,763 A | 10/2000 | Smith et al. ................ 713/300 |
| 6,218,930 B1 | 4/2001 | Katzenberg et al. ... 340/310.01 |
| 6,236,478 B1 * | 5/2001 | Stoll ........................... 398/27 |
| 6,246,497 B1 | 6/2001 | Bateman et al. ............ 359/110 |
| 6,522,436 B1 * | 2/2003 | Roberts et al. ............... 398/27 |
| 6,810,215 B1 * | 10/2004 | Oikawa ...................... 398/175 |

* cited by examiner

*Primary Examiner*—David C. Payne
(74) *Attorney, Agent, or Firm*—Workman Nydegger

(57) ABSTRACT

A system and method of selecting and viewing communication traffic transmitted over an optical channel selected from among a plurality of possible channels without disrupting the communication traffic occurring over the selected channel or other channels is presented. The system and method includes an optical channel analyzing switch which taps each of the possible plurality of channels and selects a specific channel for routing to a network analyzer. The signal on the selected channel, prior to being analyzed by the network analyzer, undergoes clock and data recovery and retiming/recombination to mitigate contamination from routing and switching the selected original signal between the signal source and the network analyzer. The retimed and recombined channel signal results in a signal, as presented to the network analyzer, which is representative of the original channel signal.

21 Claims, 8 Drawing Sheets

OPTICAL CHANNEL SELECTION AND EVALUATION SYSTEM

BACKGROUND OF THE INVENTION

1. The Field of the Invention

The present invention relates to a circuit and system for selecting and evaluating an optical communication channel. In particular, the invention relates to an optical integrated in-line switching device for selecting a specific communication channel for evaluation.

2. Background and Related Art

Communication system channels have largely been composed of metallic conductors such as copper or other low resistance metals. Systems using such conductors have generally been relatively easy to monitor and evaluate without great disruption or intrusion into the communication channel since current flows throughout the entire conductor and portions of the conductor can be externally "tapped" with another conductor attached to the test equipment that bleeds-off a negligible amount of test current.

Additionally, conductive fibers that transmit light have also been used as communication channel medium and have proven to be advantageous for the transmission of large amounts of information, both in digital and analog form. Fiber conductors, unlike metallic conductors, propagate the information signal in a very longitudinally directional path. Furthermore, the information signal propagates down a very narrow internal portion of the conductor making the non-intrusive external "tapping" of the fiber impractical.

Therefore, in order to monitor a fiber channel, a splitter also known as a coupler, must be placed "in-line" with the fiber channel to reflect a portion of the light from the main conductive fiber channel to another conductive fiber channel that can be coupled to a network analyzer or other test equipment. In FIG. 1, a system 100 for monitoring a plurality of fiber channels 102–108 is depicted with a corresponding plurality of dedicated couplers 110–116 connecting with a corresponding plurality of dedicated test equipment 118–124. While such an arrangement makes in-line testing possible, the installation of such couplers into the individual channels has been complex and tedious.

Additionally, even when the couplers are inserted into the various individual fiber channels, the logistics and expense of connecting dedicated test equipment to each channel soon becomes prohibitively expensive. Also, even if a single piece of test equipment is reused on multiple channels, the logistics of disconnecting and reconnecting to each of the various couplers becomes expensive, tedious, and, especially when remote monitoring is desired, impractical or impossible to timely access and physically re-couple with each of the channels.

There is a need to provide a non-intrusive solution that efficiently uses network analysis resources while allowing the channel to remain intact without interrupting the flow of traffic on the channel. Furthermore, a need exists for providing convenient selection of channels for monitoring without impacting the flow of communications traffic on the channel under analysis. There further exists a need to efficiently utilize test equipment without requiring deployment of a full suite of test equipment dedicated to each communication channel.

BRIEF SUMMARY OF THE INVENTION

A system and method of selecting and viewing communication traffic transmitted over an optical channel selected from among a plurality of channels without intruding upon the normal traffic of that selected channel or requiring a separate channel dedicated to monitoring and analyzing is presented. The system and method for selecting and analyzing the channel from among a plurality of channels includes an optical channel analyzing switch for selecting the channel to be monitored from among several channels and test equipment such as a network analyzer for evaluating the selected channel.

The optical channel analyzing switch includes an optical coupler for each of the plurality of possibly analyzed channels. The optical coupler receives an input optical signal and splits the signal into two paths, a first pass-through path that provides continuous normal routing of optical channel traffic and a second analyzable output optical path that "taps" the channel and routes the input optical signal for that channel for routing to analyzer equipment when selected.

Because the analyzable output signal will be routed through various switching and control elements before arriving at the test equipment or network analyzer, the analyzable output optical signal is converted from an optical or light signal into an analyzable electrical signal. This conversion is performed by a receiver having an optical input and an electrical signal output.

The optical channel analyzing switch further includes a multiplexor coupled on the inputs to the analyzable electrical signals of the severally available optical channels. The multiplexor is preferably computer controlled to select an output from among one of the potentially several inputs. While the optical channel analyzing switch may operate as an individual unit, in another embodiment, the optical channel analyzing switch may be cascaded to a second or more optical channel analyzing switch for selecting a channel for output to the test equipment or network analyzer from among the first plurality of channels connected to the first optical channel analyzing switch or a second or more plurality of channels connected to the second optical channel analyzing switch. This cascading of switches together is preferably accomplished by interconnecting the multiplexors of each of the switches as discussed in detail below.

Because of the extended signal path associated with routing the tapped optical input signal to the analyzing test equipment and further in view of the noise introduced into the signal through the multiplexor and other related electronics, it is desirable to retime the signal after the multiplexor output to recover the clock and data signal and to realign those signals in relation to each other. Retiming is desirable in order to restore the signal integrity after passing through various electronic paths that distort the signal and prior to presenting the signal to the test equipment or network analyzer. Without retiming the signal, false errors generated by the jitter, distortion and noise not present in the original optical signal but introduced by the electronic components could trigger errors in the test equipment that were not present in the original input optical signal.

The optical channel analyzing switch also converts the retimed electrical output signal into a retimed optical signal through the use of a transmitter which outputs an optical output signal compatible with optical front-end test equipment such as an optical network analyzer. The optical signal is then ready and available for analysis and monitoring by a single dedicated test equipment such as a network analyzer.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
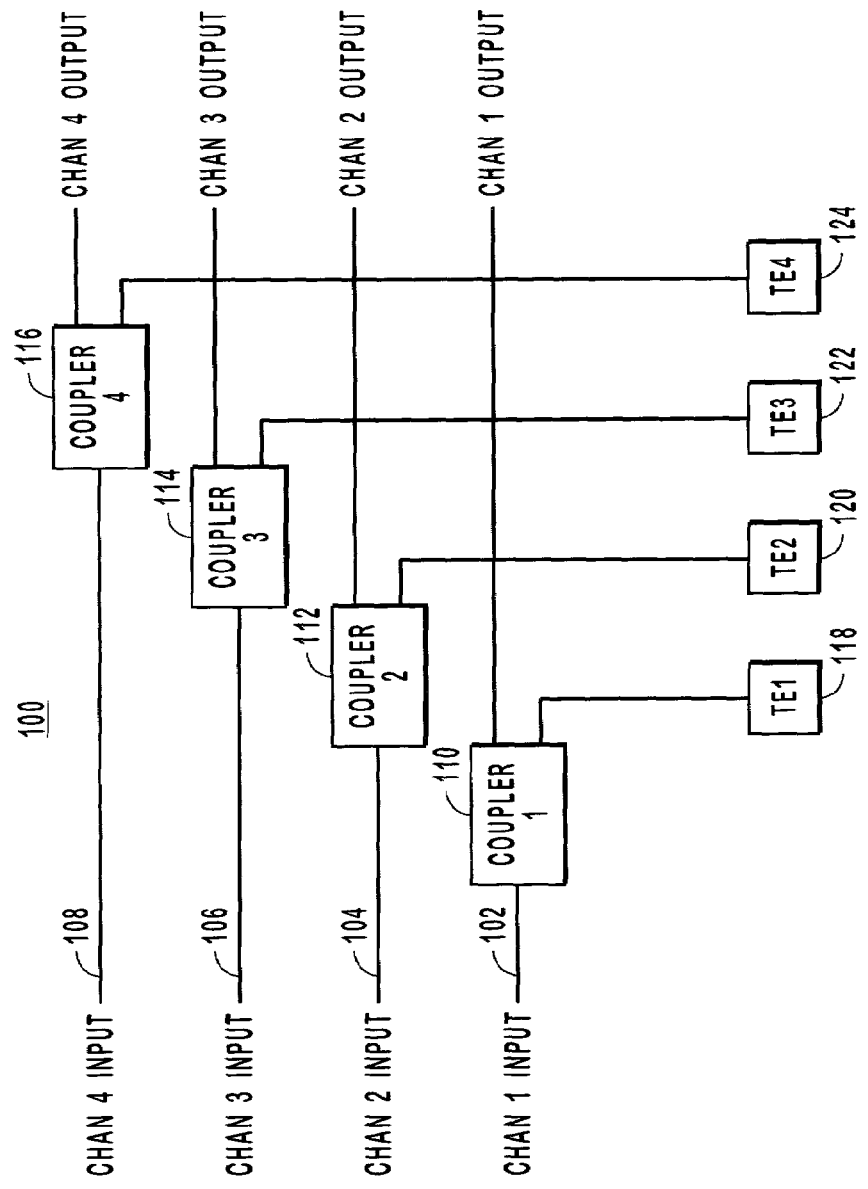
FIG. 1 illustrates monitoring of multiple channels on an optical network, in accordance with the prior art.
Figure 2:
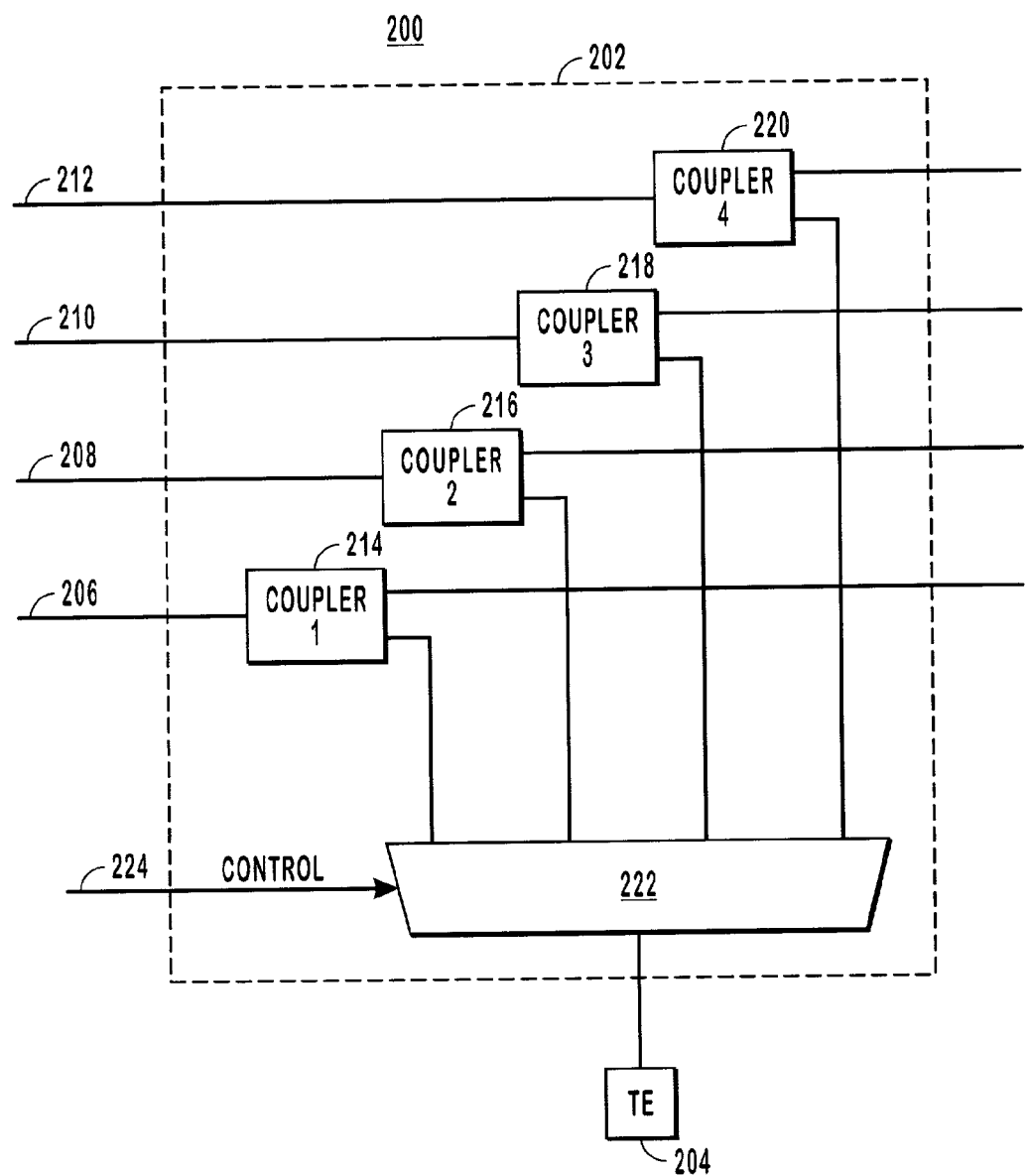
FIG. 2 illustrates a block diagram of a plurality of optical channels having a switching mechanism capable of selecting one of the optical channels for routing to a common or shared analyzer.
Figure 3:
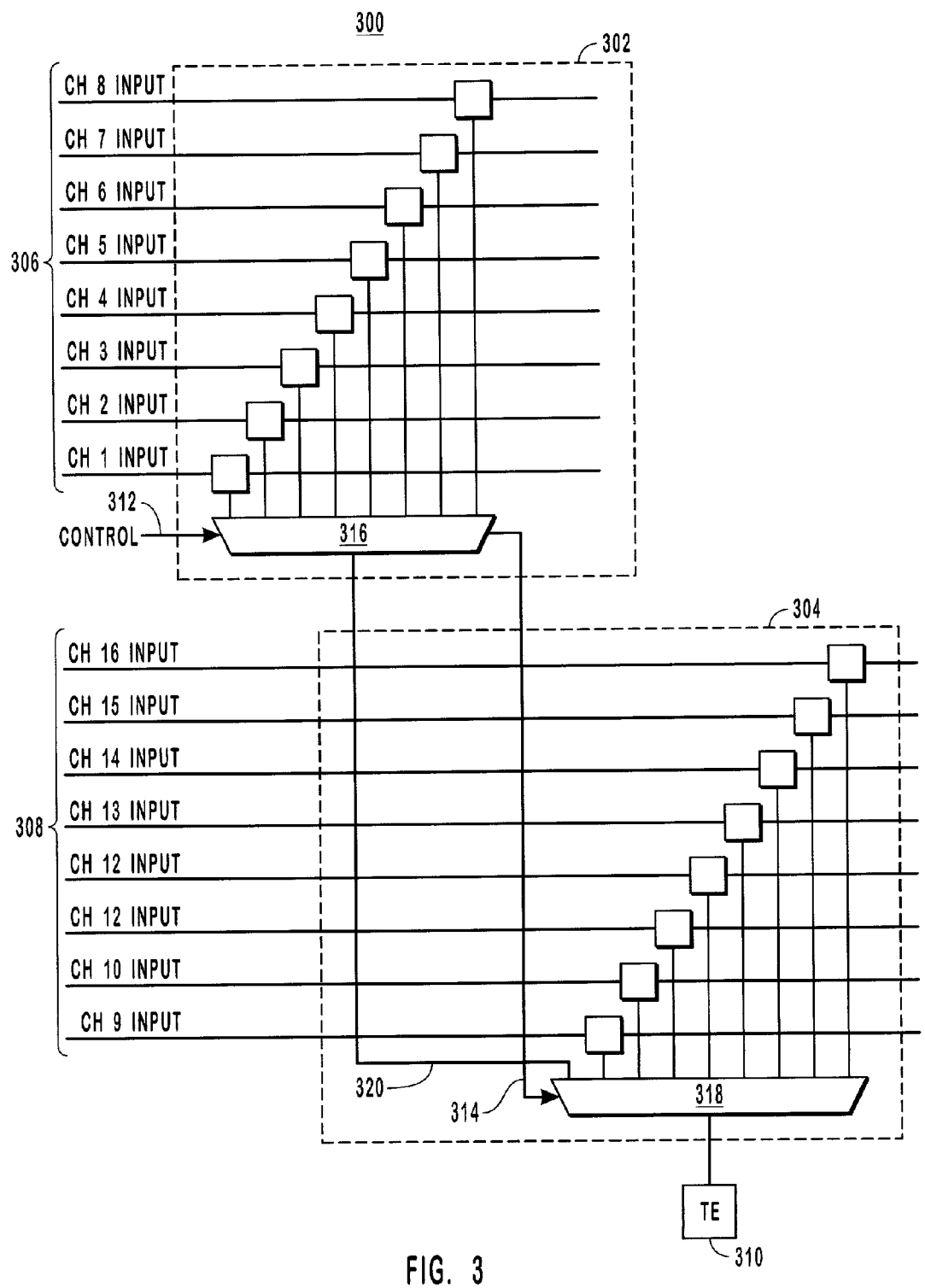
FIG. 3 illustrates a block diagram of a cascaded array of optical analyzing switches forming an extended network evaluation system.

FIGS. 2 and 3 represent different embodiments of optical network evaluation systems and are presented herein to facilitate the understanding of the manner in which the novel optical channel analyzing switches described below in reference to FIGS. 4 and 5A–D can be used. The network evaluation system 200 of FIG. 2 provides a system and method of viewing traffic over an optical channel without impacting the performance of the individual channel under observation or requiring disconnection and recoupling of the test equipment with each successively observed channel.

Referring to FIG. 2, network evaluation system 200 includes an optical channel analyzing switch 202 and a channel-shared test equipment such as a network analyzer 204. The optical channel analyzing switch 202 selects a particular channel for monitoring and/or analyzing from among a plurality of channels, for example, channels 206–212. The architecture of FIG. 2 enables a single or shared test equipment 204 to monitor a plurality of channels.

The network evaluation system 200 may operate within a network configuration which, by way of example, may include a full-duplex or half-duplex Gigabit Ethernet or Fibre Channel configuration. Those of skill in the art appreciate that Gigabit Ethernet may operate on either single-mode fiber or multi-mode fiber at data rates that require optical connections. Similarly, Fibre Channel details computer channel communications over fiber optics at transmission speeds from 132 Mbps to 1062.5 Mbps at distances of up to 10 kilometers.

As illustrated in FIG. 2, optical channel analyzing switch 202 receives optical channels 206–212 and "taps" each of the channels using optical couplers 214–220 to provide a sample of each of the channels to a switching array, depicted in FIG. 2 as multiplexor 222. Multiplexor 222 selects a specific channel from among a possible plurality of channels under direction from a control signal 224 which may be discretely controlled by a network administrator from a remote location or manually controlled through local means.

It should be appreciated that the routing of the "tapped" sample signal from optical channels 206–212 to the input of test equipment 204 introduces jitter and noise to the signal and reduces the signal to noise ratio of the signal carried on the channel under evaluation. In order to mitigate such signal contamination, additional functionality, illustrated in subsequent FIGS. 4 and 5A–D, restores or retimes the data and clock relationship. Additionally, prior to being input to the test equipment, the signal is processed according to the invention to comply with the input signal requirements of the test equipment or network analyzers that evaluate optical channels. For example, if the network analyzer is optical, the signal is converted from an electrical signal to an optical signal. If the network analyzer requires an electrical signal, the signal is transduced according to the input signal requirements of the network analyzer.

FIG. 3 illustrates a block diagram of a cascading array of optical analyzing switches forming a network evaluation system for analyzing an additional quantity of optical channels, and represents another way in which the optical channel analyzing switches of the invention can be used. According to FIG. 3, network evaluation system 300 includes a first optical channel analyzing switch 302 cascaded with a second optical channel analyzing switch 304 for selecting a channel for analysis from among a first plurality of input channels 306 and a second plurality of input channels 308.

The selection of the channel for analysis or monitoring by test equipment 310 is directed by control signal 312 received at first optical channel analyzing switch 302 which is also coupled to second optical channel analyzing switch 304 via a control signal 314. Physical selection and routing of the specific channel to the test equipment 310 is performed by respective multiplexors 316 and 318. If a channel from first optical channel analyzing switch 302 is selected, it is routed into a cascade multiplexor input 320 for facilitating a single routing connection to test equipment 310.

Figure 4:
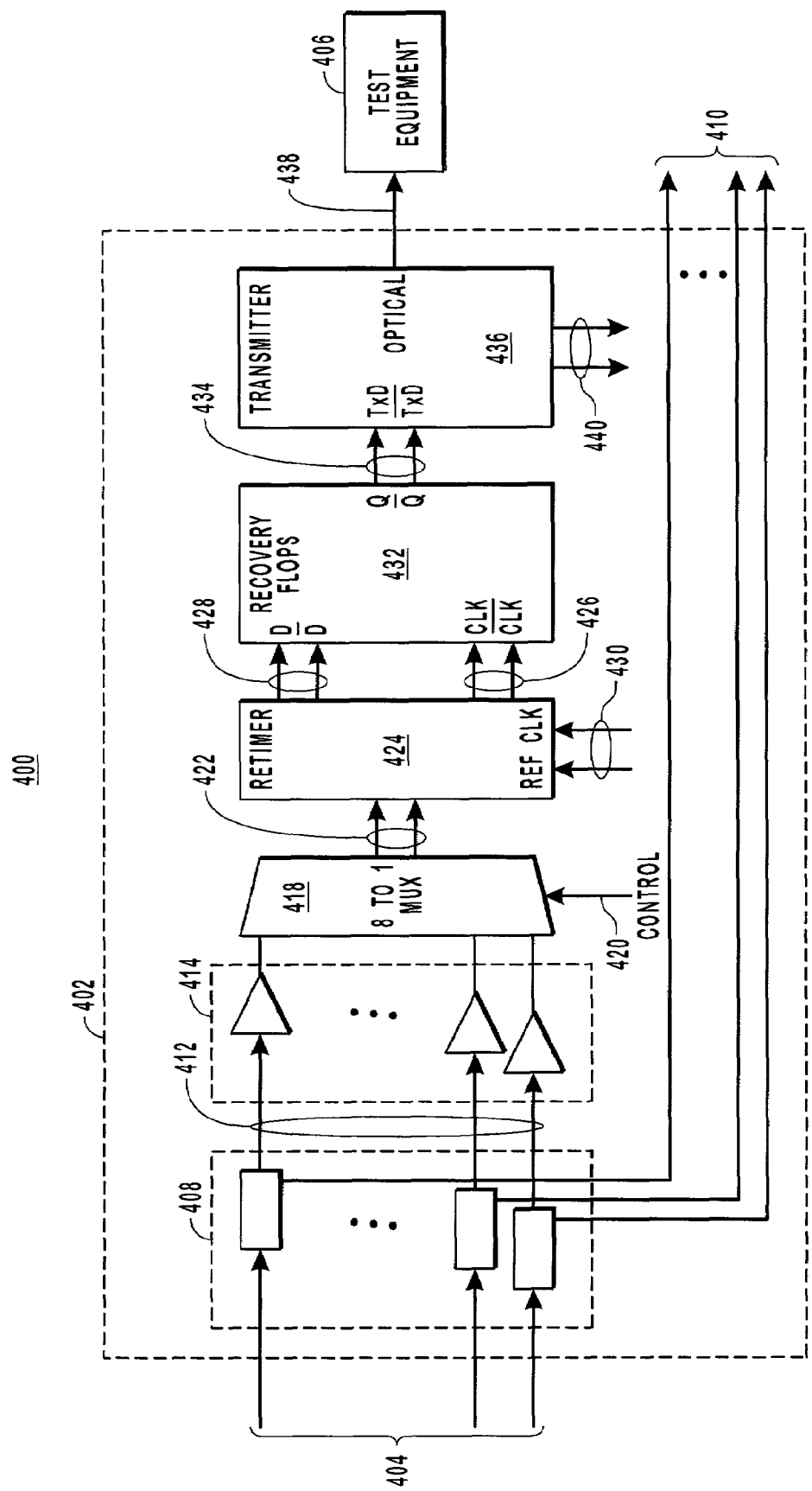
FIG. 4 illustrates a detailed block diagram of a network evaluation system, in accordance with a preferred embodiment of the present invention.
Figure 5A:
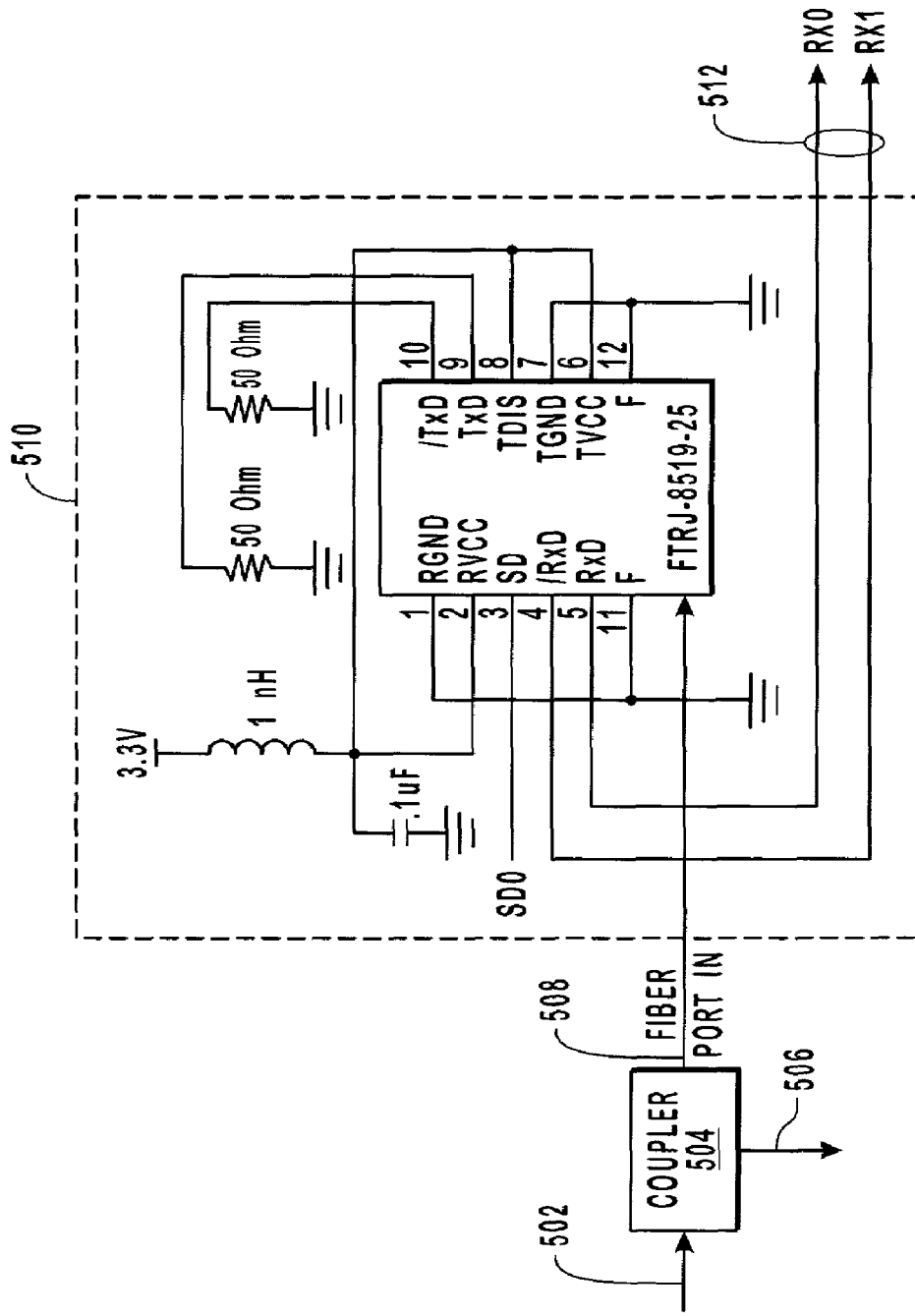
FIG. 5 is a schematic diagram of an optical channel analyzing switch for selecting from among a plurality of optical channels, in accordance with the preferred embodiment of the present invention.
Figure 5B:
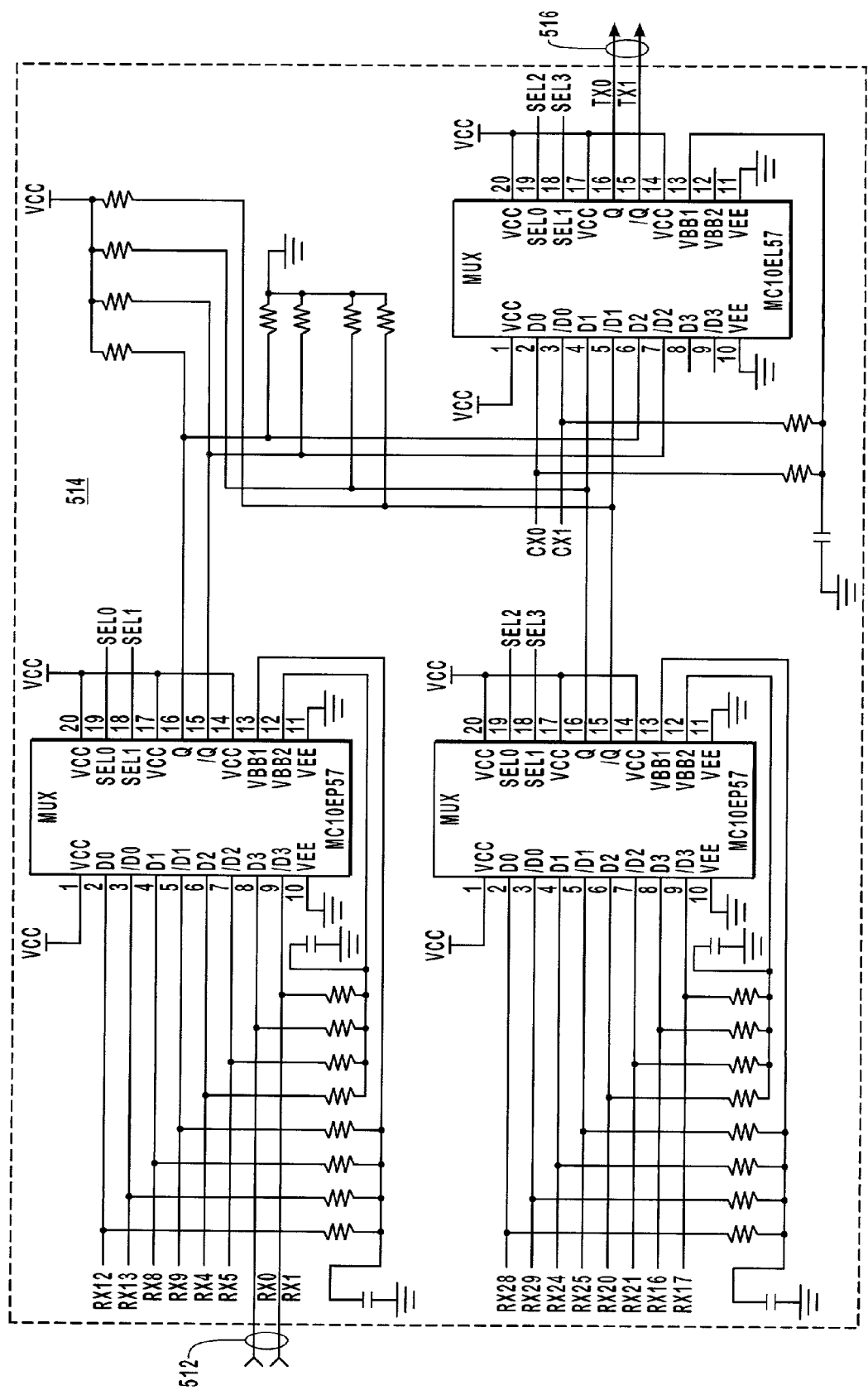
Figure 5C:
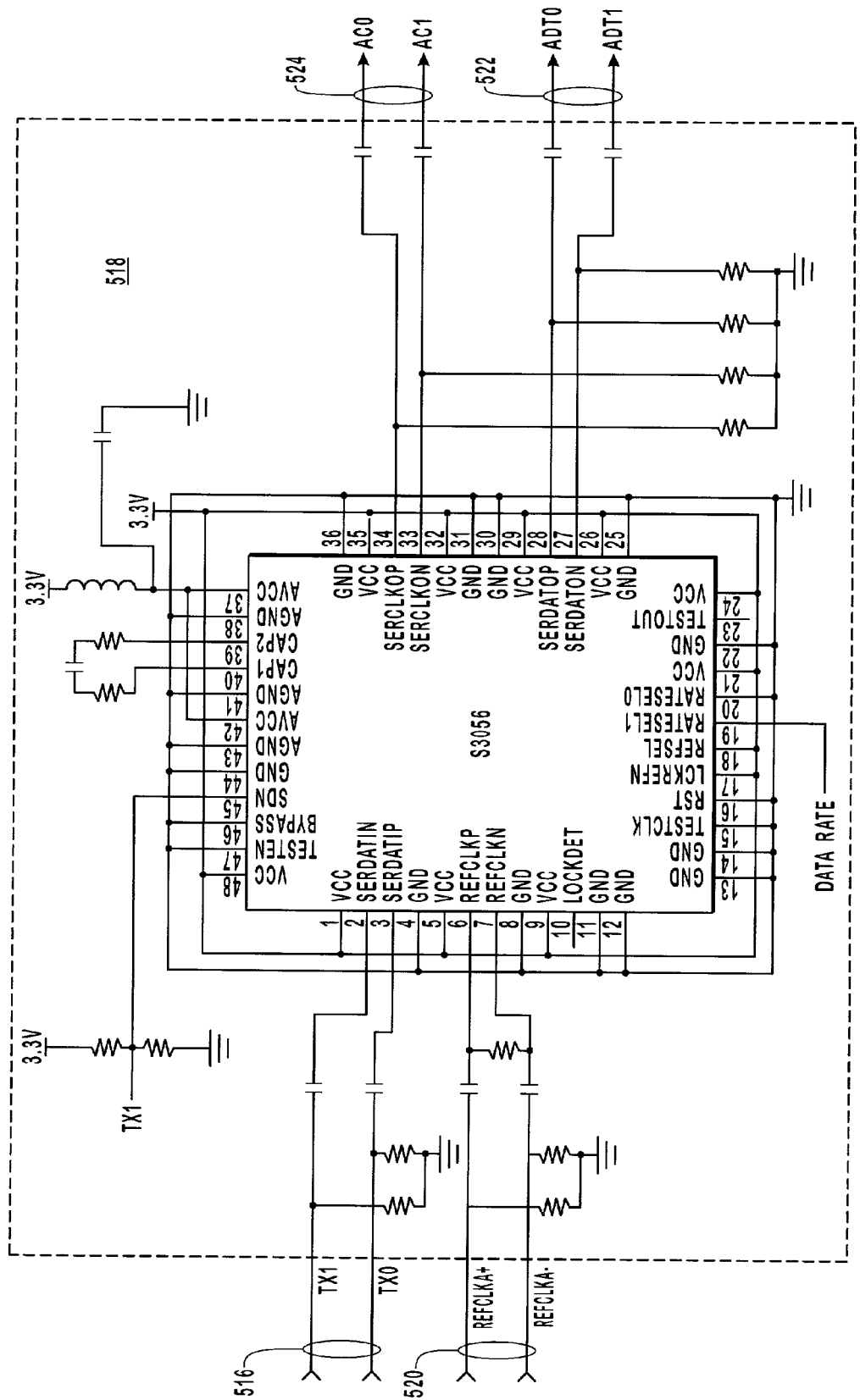
Figure 5D:
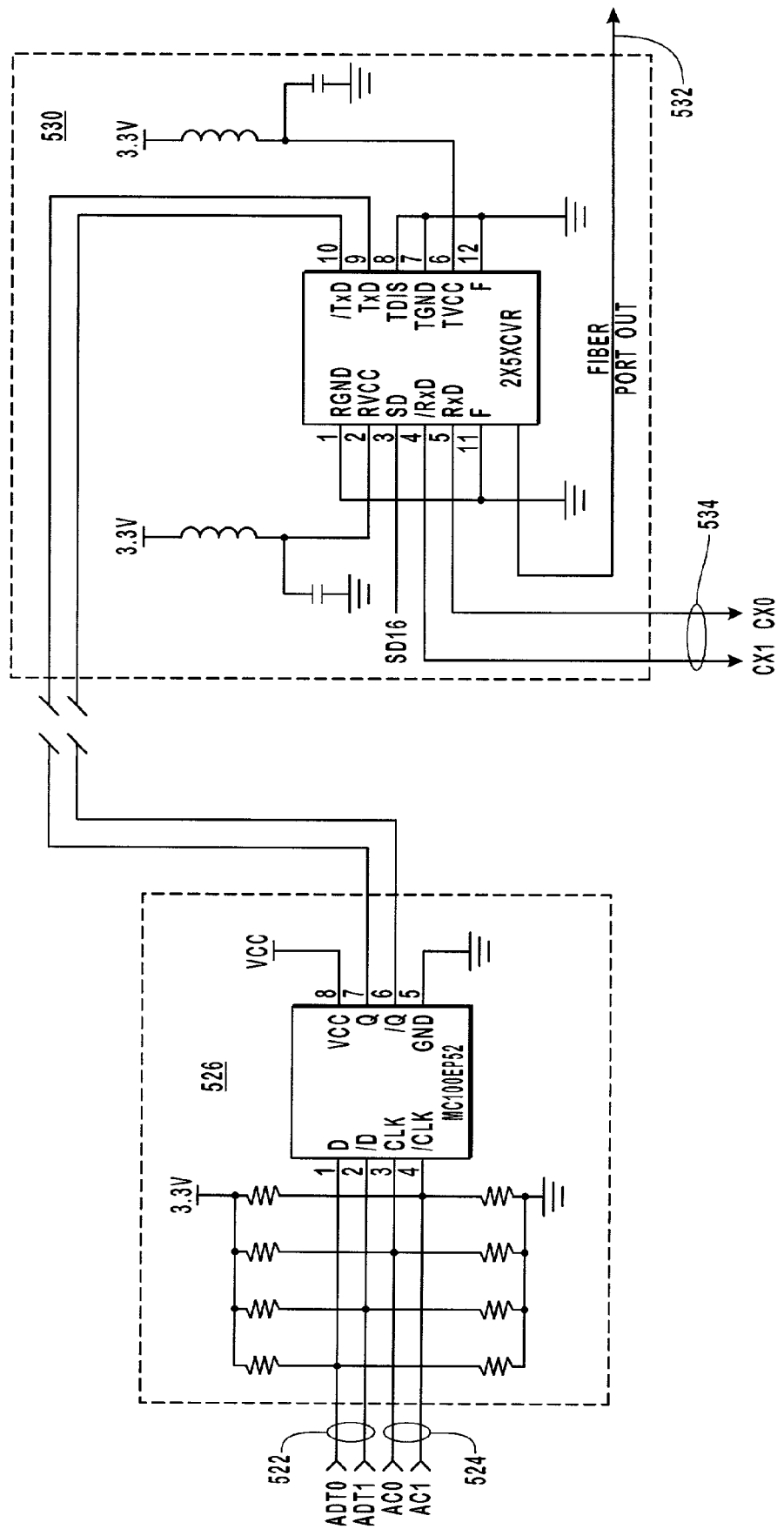

FIG. 4 is a functional block diagram of an optical channel analyzing switch in accordance with a preferred embodiment of the present invention. An analyzing system 400 is depicted as including an optical channel analyzing switch 402 for selecting a specific channel from among a plurality of channels 404 for coupling with test equipment 406. Plurality of channels 404 is comprised of optical channels which may be implemented as single-mode or multi-mode fibers and operated at various channel standards and capacities such as Gigabit Ethernet or Fibre Channel. The present invention facilitates the monitoring and evaluation of a specific channel without interruption to that specific channel's traffic. Such an implementation is facilitated by coupling channels 404 to individual optical couplers 408 which split or "tap" each of the individual channels and provide two groups of outputs, one being a group of pass-through outputs 410 and a second group of outputs depicted as analyzable output optical signals 412.

One benefit of the cascading capabilities of this embodiment is that two or more units and associated switches can be combined to tap and analyze more channels than could be handled by a single unit. The combined, or cascaded, switches can be controlled together as a single combined system. These features are in contrast with the system configuration that would otherwise be required, in which multiple independent switches would be used to tap different channels, with each switch being controlled separately one from another.

Analyzable output optical signals 412 directly couple with receivers 414 which perform optical-to-electrical conversion thereby facilitating the signal timing and manipulation in electrical form as opposed to the more complex optical signal manipulation. Receivers 414 convert analyzable output optical signals 414 into analyzable electrical signals 416 which are coupled to a multiplexor 418, which in FIG. 4 is depicted for illustrative purposes only as being an 8-to-1 multiplexor. Multiplexor 418 selects, according to control signal 420, one of the input signals from among analyzable electrical signals 416 as the output signal depicted as multiplexor output signal 422. Signal 422 then undergoes various signal modifications in order to restore the timing relationship of the signal which has been contaminated by the extended propagation path through optical channel analyzing switch 402 as well as the noise contamination inherent in electrical devices and components within optical channel analyzing switch 402.

In optical channel analyzing switch 402, a retimer 424 receives a multiplexor output signal 422 in electrical form and performs a clock recovery function which extracts the clock from the serial data and generates retimed data signal. This retiming operation reduces the jitter that would otherwise be introduced into the signal provided to the test equipment 406. In this manner, the optical channel analyzing switches of the invention provide significant advantages over switches of the prior art.

In order to prepare retimed electrical analyzable output signal 434 to be evaluated by optical test equipment 406, the output signal is converted into an optical format. A transmitter 436 receives retimed electrical analyzable output signals 434 in electrical form and transforms those electrical signals into a retimed optical analyzable output signal 438 which is an approximation in optical form of the selected input signal from among the plurality of channels 404 selected by multiplexor 418.

If the test equipment analyzes electrical signals rather than optical signals, no conversion of the output signal 438 to optical form is needed. Instead, the transmitter 436 included in optical channel analyzing switch 402 performs transducing operations to process the output signal 438 such that it complies with the input signal requirements of the test equipment. Accordingly, optical channel analyzing switch 402 includes a transmitter 436 that is selected to process the output signal 438 in an appropriate manner such that the output signal complies with the input signal requirements of the test equipment. The type of transmitter 436 is typically determined by the type of test equipment (optical or electrical) with which the optical channel analyzing switch is to be used.

As described above in FIG. 3, the present invention also includes an embodiment capable of cascading or coupling a plurality of optical channel analyzer switches, such as 402, for selecting from among an even greater plurality of inputs 404. Transmitter 436 includes electrical outputs 440, which may be further coupled with a multiplexor of another optical channel analyzer switch as depicted in FIG. 3.

FIGS. 5A–5D represent a schematic diagram of a single channel of the optical channel analyzing switch, in accordance with one implementation of the preferred embodiment of the present invention. In FIGS. 5A–5D, input optical signal 502 is coupled to a multi-mode wide-band fiber coupler 504. In addition to an input, coupler 504 is further comprised of two output signals, a pass-through output signal 506 and an analyzable output optical signal 508 in optical form. It is desirable that coupler 504 exhibit low insertion loss, high directivity, high stability and reliability and low excess loss. By way of example and not limitation, coupler 504 may be comprised of a multi-mode coupler such as an MMC-Multimode Wideband Fiber Coupler, manufactured by Transwave Fiber, Inc., of Fremont, Calif.

Optical signal 508 is coupled to a receiver portion which exhibits acceptable operational characteristics in converting from optical to electrical transmissions. It would be desirable for a receiver 510 to exhibit high-speed data rates up to and in excess of 2.125 Gbit/sec which is compatible with Fibre Channel and Gigabit Ethernet data rates. Additionally, receiver 510 would desirably exhibit very low jitter, low power dissipation, and for ease of integration exhibit a small form-factor. By way of example and not limitation, receiver 510 may be comprised of transceiver implemented in a receiver mode only such as a 2 gigabit/2x5 transceiver FTRJ-8519-1-25 available from Finisar Systems of Sunnyvale, Calif.

A receiver 510 generates analyzable electrical signals 512, now in electronic rather than optical form which are coupled to a multiplexor 514. It is desirable that multiplexor 514 exhibit sufficient addressability for individually selecting from among the plurality of possible channels presented to the optical channel analyzing switch 500. Also, multiplexor 514 desirably operates at propagation delays and frequencies consistent with the frequencies of the communication standards being evaluated. FIGS. 5A–5D illustrate multiplexor 514 implemented using a plurality of discrete 4-to-1 multiplexors arranged to implement an 8-to-1 multiplexor configuration. By way of example, multiplexor 514 is implemented using a plurality of multiplexor devices such as the MC10EP57 and MC10EL57 available from ON Semiconductor, Phoenix, Ariz.

The selected output signals 516 including reference clock signals 520 are coupled to a retimer circuit 518 to generate output data signals 522 and output clock signals 524. Retimer 518 extracts the clock from the serial data and generates retimed clock signal 524 and retimed data signal 522. Retimer circuit 518 desirably performs continuous-rate clock and data recovery, at the desirable data rate standards of at least Fibre Channel and Gigabit Ethernet. It is also desirable for retimer circuit 518 to exhibit low jitter and sufficient input sensitivity. By way of example and not limitation, retimer circuit 518 may be comprised of an S3056 clock recovery device that performs the clock recovery function for various optical standards including SONET, Fibre Channel, and Gigabit, Ethernet. The S3056 is capable of operating at 30 Mbps to 2.7 Gbps continuous-rate clock and data recovery. The exemplary device is available from Applied Micro Circuits Corporation of San Diego, Calif.

Output signals 522 and 524 are further coupled to a latch or flip-flop configuration 526. The purpose of latch 526 is to recombine the timing-realigned separated clock signal 524 and data signal 522 into combined retimed electrical analyzable output signal 528. By way of example and not limitation, an exemplary latch configuration 526 may be comprised of a "D" flip-flop such as an MC100EP52 available from various sources including ON Semiconductor, Phoenix, Ariz.

Outputs 528 are further coupled to a transmitter for converting from an electrical signal to an optical signal by way of a transmitter 530. Transmitter 530 generates an optical output 532 for coupling with the test equipment. Transmitter 530 also alternatively generates cascading signals 534 for coupling with additional switches in an alternate embodiment, as discussed above. By way of example and not limitation, an exemplary transmitter 530 may be comprised of a FTRJ-8519-1-25 available from Finisar Systems of San Jose, Calif.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical channel analyzing switch for selecting from among a first plurality of channels, comprising:
   an optical coupler for each of said first plurality of channels to receive an input optical signal and generate a pass-through output optical signal and an analyzable output optical signal;
   a receiver for each of said first plurality of channels coupled to receive said analyzable output optical signal and to convert said analyzable output optical signal into an analyzable electrical signal;
   a multiplexor coupled at a plurality of multiplexor inputs to each of said analyzable electrical signals, said multiplexor to select a multiplexor output from one of said analyzable electrical signals;
   a retimer coupled at said multiplexor output for generating a retimed data signal from said one of said analyzable electrical signals; and
   a transmitter for converting said retimed data signal such that said retimed data signal approximates said input optical signal and complies with input signal requirements of a network analyzer to which the retimed data signal is to be transmitted
   wherein said transmitter further compnses a cascade port coupled to said retimed data signal for coupling to a second optical channel analyzing switch having a second plurality of channels, said optical channel analyzing switch capable of multiplexing a channel from among said first plurality of channels and said second plurality of channels for coupling with said network analyzer.

2. The optical channel analyzing switch, as recited in claim 1, wherein said retimer comprises:
   a clock recovery circuit for recovering said clock signal from said one of said analyzable electrical signals at said multiplexor output and generating a clock signal and a data signal therefrom;
   at least one reference clock for providing a reference clock to said clock recovery circuit; and
   a flip-flop for receiving said clock signal and said data signal and generating said retimed data signal.

3. The optical channel analyzing switch, as recited in claim 2, wherein said at least one reference clock is user selectable from among a plurality of frequencies.

4. The optical channel analyzing switch, as recited in claim 3, wherein said reference clock operates at one of a frequency compatible with Gigabit Ethernet and Fibre Channel frequencies.

5. The optical channel analyzing switch, as recited in claim 1, wherein said optical coupler isolates said receiver from said input optical signal when said receiver is non-operational to continue to generate said pass-through output optical signal.

6. The optical channel analyzing switch, as recited in claim 1, wherein the transmitter converts said retimed data signal from an electrical form to an optical form.

7. The optical channel analyzing switch, as recited in claim 1, wherein the transmitter converts said retimed data signal such that said retimed data signal retains its electrical form and is transduced to comply with the input signal requirements of the network analyzer.

8. In an optical channel analyzing switch for selecting from among a plurality of channels, a method for switching one of said plurality of channels of data transmitted over a plurality of optical fibers to a network analyzer without disturbing data transmission on said plurality of channels, said method comprising the steps of:
   for each of said plurality of channels of data, splitting an input optical signal into a pass-through optical signal and an analyzable output optical signal;
   for each of said plurality of analyzable output optical signals, converting said analyzable output optical signal into an analyzable electrical signal;
   multiplexing said plurality of analyzable electrical signals to select one of said analyzable electrical signals as a multiplexor output;
   retiming said one of said analyzable electrical signals to generate a retimed data signal;
   converting said retimed data signal such that said retimed data signal approximates said input optical signal and complies with input signal requirements of a network analyzer to which the retimed data signal is to be transmitted;
   operably coupling in a cascade arrangement said retimed data signal with a second optical channel analyzing switch having a second plurality of channels; and
   multiplexing a channel from among said first plurality of channels and said second plurality of channels for coupling with said network analyzer.

9. The method for switching one of a plurality of channels of data, as recited in claim 8, wherein said retiming step comprises the steps of:
   recovering a clock signal and a data signal form said one of said plurality of analyzable electrical signals; and
   converting said clock signal and said data signal into said retimed data signal.

10. The method for switching one of a plurality of channels of data, as recited in claim 9 wherein said retiming step further comprises the step of:
    supplying at least one reference clock to recover said clock signal and said data signal from said one of said plurality of analyzable electrical signals.

11. The method for switching one of a plurality of channels of data, as recited in claim 10, wherein said retiming step further comprises the step of:
    selecting said reference clock from among a plurality of frequencies compatible with Gigabit Ethernet and Fibre Channel frequencies.

12. The method for switching one of a plurality of channels of data, as recited in claim 8, wherein said splitting an input optical signal step further comprises the step of:
    isolating said pass-through output optical signal from said analyzable output optical signal such that upon non-operation on said analyzable output optical signal, data on said pass-through output optical signal is not affected.

13. A network evaluation system, comprising:
    a network analyzer; and
    an optical channel analyzing switch for transmitting a retimed data signal corresponding to any of a first plurality of channels to the network analyzer so as to enable the network analyzer to analyze the retimed data signal, said optical channel analyzing switch including:

an optical coupler for each of said first plurality of channels to receive an input optical signal and generate a pass-through output optical signal and an analyzable output optical signal;

a receiver for each of said first plurality of channels coupled to receive said analyzable output optical signal and to convert said analyzable output optical signal into an analyzable electrical signal;

a multiplexor coupled at a plurality of multiplexor inputs to each of said analyzable electrical signals, said multiplexor to select a multiplexor output from one of said analyzable electrical signals;

a retimer coupled at said multiplexor output for generating a retimed data signal from said one of said analyzable electrical signals; and a transmitter for converting said retimed data signal such that said retimed data signal approximates said input optical signal and complies with input signal requirements of the network analyzer;

wherein said transmitter of said optical channel analyzing switch further comprises a cascade port coupled to said retimed data signal for coupling to a second optical channel analyzing switch having a second plurality of channels, said optical channel analyzing switch capable of multiplexing a channel from among said first plurality of channels and said second plurality of channels for coupling with said network analyzer.

14. The network evaluation system, as recited in claim 13, wherein said retimer of said optical channel analyzing switch comprises:

a clock recovery circuit for recovering said clock signal from said one of said analyzable electrical signals at said multiplexor output and generating a clock signal and a data signal therefrom;

at least one reference clock for providing a reference clock to said clock recovery circuit; and a flip-flop for receiving said clock signal and said data signal and generating said retimed data signal.

15. The network evaluation system, as recited in claim 14, wherein said at least one reference clock of said optical channel analyzing switch is user selectable from among a plurality of frequencies.

16. The network evaluation system, as recited in claim 15 wherein said reference clock of said optical channel analyzing switch operates at one of a frequency compatible with Gigabit Ethernet and Fibre Channel frequencies.

17. The network evaluation system, as recited in claim 13, wherein said optical coupler of said optical channel analyzing switch isolates said receiver from said input optical signal when said receiver is non-operational to continue to generate said pass-through output optical signal.

18. An optical channel analyzing system for selecting an optical input signal from among a plurality of optical input signals carried by a plurality of optical channels, comprising:

a first optical channel analyzing switch including:

a plurality of optical couplers, each being associated with a particular one of the plurality of optical channels, wherein each optical coupler is capable of splitting an optical input signal carried by the associated optical channel so as to not interfere with network traffic of the optical channel;

a retimer that receives an analyzable electrical signal derived from one of the optical signals, wherein the retimer recovers a clock signal and a data signal from the optical signal, such that a retimed electrical signal with reduced noise can be generated;

a transmitter for converting the retimed electrical signal into a retimed optical analyzable output signal that approximates said one of the optical input signals and that can be transmitted to a network analyzer;

a second optical channel analyzing switch connected with said first optical channel analyzing switch, wherein the retimed electrical signal has noise that is sufficiently reduced such that either the first or second optical channel analyzing switch can be used to process the optical input signals split by the optical couplers of the first optical channel analyzing switch; and a third optical channel analyzing switch connected with said second optical channel analyzing switch, wherein the retimed electrical signal has noise that is sufficiently reduced such that either the first, second or third optical channel analyzing switch can be used to process the optical input signals split by the optical couplers of the first optical channel analyzing switch.

19. An optical channel analyzing system as recited in claim 18, further comprising a fourth optical channel analyzing switch connected with said third optical channel analyzing switch, wherein the retimed electrical signal has noise that is sufficiently reduced such that either the first, second, third or fourth optical channel analyzing switch can be used to process the optical input signals split by the optical couplers of the first optical channel analyzing switch.

20. An optical channel analyzing system as recited in claim 18, further comprising:

a receiver associated with the plurality of channels that are capable of converting the optical input signals to analyzable electrical signals; and a multiplexor coupled at a plurality of multiplexor inputs to each of the analyzable electrical signals, said multiplexor to select a multiplexor output from one of said analyzable electrical signals, wherein the retimer receives said analyzable electrical signal derived from said one of the optical signals from the multiplexor output.

21. An optical channel analyzing system as recited in claim 18, further comprising a flip-flop for receiving said clock signal and said data signal and generating said retimed electrical analyzable signal with reduced noise.

* * * * *

UNITED STATES PATENT AND TRADEMARK OFFICE
CERTIFICATE OF CORRECTION

| | | |
|---|---|---|
| PATENT NO. | : 7,031,615 B2 | Page 1 of 1 |
| APPLICATION NO. | : 09/971970 | |
| DATED | : April 18, 2006 | |
| INVENTOR(S) | : Gentile | |

It is certified that error appears in the above-identified patent and that said Letters Patent is hereby corrected as shown below:

Column 5
Line 6, remove [416]
Line 11, remove [416]

Column 7
Line 35, change "compnses" to --comprises--

Column 10
Line 4, after "capable", insert --of--

Signed and Sealed this
Twenty-third Day of August, 2011

David J. Kappos
*Director of the United States Patent and Trademark Office*